US010096109B1

(12) United States Patent
Zaharchuk et al.

(10) Patent No.: US 10,096,109 B1
(45) Date of Patent: Oct. 9, 2018

(54) QUALITY OF MEDICAL IMAGES USING MULTI-CONTRAST AND DEEP LEARNING

(71) Applicants: Greg Zaharchuk, Stanford, CA (US); Enhao Gong, Stanford, CA (US); John M. Pauly, Stanford, CA (US)

(72) Inventors: Greg Zaharchuk, Stanford, CA (US); Enhao Gong, Stanford, CA (US); John M. Pauly, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 60 days.

(21) Appl. No.: 15/475,760

(22) Filed: Mar. 31, 2017

(51) Int. Cl.
*G06K 9/00* (2006.01)
*G06T 7/00* (2017.01)
*G06T 3/60* (2006.01)

(52) U.S. Cl.
CPC ............. *G06T 7/0012* (2013.01); *G06T 3/60* (2013.01); *G06T 2207/10081* (2013.01); *G06T 2207/10088* (2013.01)

(58) Field of Classification Search
None
See application file for complete search history.

(56) References Cited

U.S. PATENT DOCUMENTS

| 2014/0270453 | A1* | 9/2014 | Guo | G06T 5/002 |
| | | | | 382/131 |
| 2015/0025666 | A1* | 1/2015 | Olivieri | G06F 17/50 |
| | | | | 700/98 |
| 2015/0282719 | A1* | 10/2015 | Fielden | A61B 5/0263 |
| | | | | 600/419 |
| 2016/0171727 | A1* | 6/2016 | Bouchard | G06T 5/002 |
| | | | | 382/131 |
| 2017/0035319 | A1* | 2/2017 | Zhao | A61B 5/055 |

(Continued)

OTHER PUBLICATIONS

Agostinelli, F., Anderson, M. R., & Lee, H. (2013). Adaptive multi-column deep neural networks with application to robust image denoising. In Advances in Neural Information Processing Systems (pp. 1493-1501).*

(Continued)

*Primary Examiner* — Vu Le
*Assistant Examiner* — Samah Beg
(74) *Attorney, Agent, or Firm* — Lumen Patent Firm

(57) ABSTRACT

A method of improving diagnostic and functional imaging is provided by obtaining at least two input images of a subject, using a medical imager, where each input image includes a different contrast, generating a plurality of copies of the input images using non-local mean (NLM) filtering, using an appropriately programmed computer, where each input image copy of the subject includes different spatial characteristics, obtaining at least one reference image of the subject, using the medical imager, where the reference image includes imaging characteristics that are different form the input images of the subject, training a deep network model, using data augmentation on the appropriately programmed computer, to adaptively tune model parameters to approximate the reference image from an initial set of the input and reference images, with the goal of outputting an improved quality image of other sets of low SNR low resolution images, for analysis by a physician.

12 Claims, 3 Drawing Sheets

(56) References Cited

U.S. PATENT DOCUMENTS

2017/0178316 A1* 6/2017 Simon .................. G06T 7/0012
2017/0339431 A1* 11/2017 Zhang .................. G06T 3/4053
2018/0089863 A1* 3/2018 Marschner ......... G01R 33/5608

OTHER PUBLICATIONS

Manjón, J. V., Coupé, P., Martí-Bonmatí, L., Collins, D. L., & Robles, M. (2010). Adaptive non-local means denoising of MR images with spatially varying noise levels. Journal of Magnetic Resonance Imaging, 31(1), 192-203.*

Xie, D., Bai, L., & Wang, Z. (2018). Denoising Arterial Spin Labeling Cerebral Blood Flow Images Using Deep Learning. arXiv preprint arXiv:1801.09672.*

* cited by examiner

Step 1: Nonlinear ASL signal denoising using Non-Local (NLM) and Multi-contrast Guided Filter

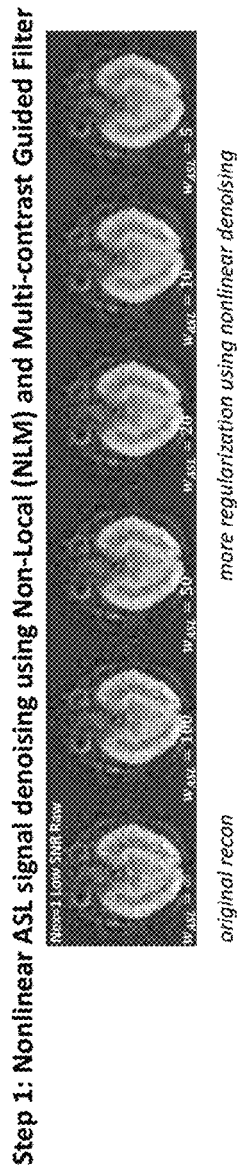

*original recon*      *more regularization using nonlinear denoising*

Step 2: Generate patches from High-SNR Ref. ASL, Low-SNR raw ASL, multi-level denoised ASL and anatomical MR images

Step 3: Applying the trained deep network to generate the nonlinear image restoration from multi-contrast patches

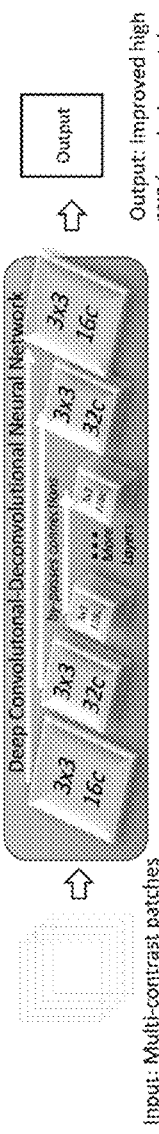

Step 4: Generate the restored image from stored patches

FIG. 2B

QUALITY OF MEDICAL IMAGES USING MULTI-CONTRAST AND DEEP LEARNING

FIELD OF THE INVENTION

The invention relates to medical imaging. More specifically the invention relates to improving the quality of medical images using multi-contrast imaging, multi-lateral filters, and deep learning methods.

BACKGROUND OF THE INVENTION

With medical image denoising, multiple methods have been proposed including, Gaussian filtering, wavelet filtering, and non-local means (NLM) algorithms, where experimentation has shown the NLM (possibly combining Wavelet) is the superior method. However, all these methods still share some disadvantages such as the dependency of parameter tuning for different images. In one instance, a proposed method used the redundancy in and relationships of multi-contrast images as a prior for image denoising. Related works have been used to combine a blurry and a noisy pair of images for CMOS sensors and cameras. A further implementation used Group-Sparsity representation for image denoising, which also used the multi-contrast information, but it was not used to advance high SNR contrast to improve the noisier contrast. In another concept relating to the redundancy of multi-contrast images, regularization for compressed sensing reconstruction of undersampled multi-contrast images was demonstrated.

There have been recent developments in deep learning research. Specifically, recent advances in convolutional neural network (CNN) for image recognition with deep residual network, and super-resolution using CNN have shown great promise for improving image resolution. In the recent 5 years, deep learning techniques have advanced the performance of computer vision, specifically in image recognition. The Deep Residual Network (ResNet) approach has been validated as a superior network structure for Convolutional Neural Networks (CNNs) because its by-pass connection helps the performance of CNN. These advances of CNN provide computer vision algorithm super-human capability for recognition. However, it is not clear that the model can be better trained for medical imaging, since there are much fewer data sets available for training, and deep networks typically need thousands or millions of samples due to the number of parameters in the model. Further, it is not clear what network structure is the best for medical images due to the intrinsic properties of medical images in that they are not the same as recognizing common objects within photos. Finally, it is not fully known how to make sure the model does not introduce artifacts that are not in the image or miss the detail of pathology that the model has not seen from the training data.

Super-resolution (SR) CNN methods are used to generate super resolution for images and videos (multi-frame). In one demonstration, with 91 images (from a public benchmark dataset), the SRCNN models can achieve good and similar performance compared with the model trained on large dataset (ImageNet with millions of sub-images). This is because the SRCNN model size (around 10K) is not as large as the model used for other image recognition methods. Further, the training samples the model sees can be counted as smaller local patches, which lead to tens of thousands of patches for the 91 full images. Additionally, the relatively few samples can already capture sufficient variability of natural images patches. SR works try to achieve better performance for aesthetic perception but does not address the need to avoid while preserving details and pathology in for medical images.

Arterial spin labeling (ASL) MM uses the signal difference between labeled and control image to quantify the blood perfusion. It is a powerful MM technique and is applied increasingly for research, study, and clinical diagnosis for neurological, cerebrovascular, and psychiatric diseases. However, ASL perfusion maps typically suffer from low SNR due to its signal subtraction. The SNR can be increased if the ASL scans are repeated three or more times for clinics to achieve an acceptable image quality. However this repeating of the scans significantly increases the testing time. Recently proposed multidelay ASL (eASL) can compensate the effect of various transit delays for better sensitivity of perfusion measurement. However, acquiring different delays further increases the time cost and results in even lower SNR and resolution due to the time constraints.

What is needed is a method of image denoising, rather than generating super-resolution, that improves medical images having multi-contrasts.

SUMMARY OF THE INVENTION

To address the needs in the art, a method of shortening imaging time for diagnostic and functional imaging is provided that includes obtaining at least two input images of a subject, using a medical imager, where each input image includes a different contrast, generating a plurality of copies of the input images of the subject using non-local mean (NLM) filtering, using an appropriately programmed computer, where each input image copy of the subject includes different spatial characteristics, obtaining at least one reference image of the subject, using the medical imager, where at least one reference image of the subject includes imaging characteristics that are different form the input images of the subject, training a deep network model, using data augmentation on the appropriately programmed computer to adaptively tune model parameters to approximate the reference image from an initial set of the input images, and outputting an improved quality image of the subject, for analysis by a physician. Once the model parameters are set, improved quality images can be obtained without the need to acquire a reference image.

According to one aspect of the invention, the medical imager includes a magnetic resonance imager (MRI), or a computed tomography (CT) scanner.

In another aspect of the invention, the data augmentation includes cropping, rotating, or flipping the input images of the subject.

In a further aspect of the invention, the imaging characteristics of at least one reference image of the subject that are different from the input images of the subject include a higher SNR, a higher resolution, less artifacts, a different image contrast, an image obtained using a CT imager, or an image obtained using an MRI imager.

In yet another aspect of the invention, the data set includes an arterial spin labeling (ASL) dataset, an MRI dataset, or a CT dataset.

According to one aspect of the invention, the data augmentation includes training a deep network model on a plurality of patches of the input images of the subject for the data augmentation, where output images of the subject are reassembled from individual input image patches.

In another aspect of the invention, multi-contrast information is used as a regularization for the NLM for improved regularized denoising and over-smoothing avoidance.

In a further aspect of the invention, the data augmentation further includes using the input images of the subject and outputs from nonlinear filters as inputs for the deep network model, where the input images of the subject are acquired from arterial spin labeling (ASL) and other contrast images of a brain, where the NLM filtering is used on the ASL image and reguarlized using the other contrast images, where the data augmentation is used on all the input images of the subject and on images created from the NLM filters, where all the augmented data is fit into the deep network model. Here, the deep network model includes using multi-contrast patches of the other images for convolution and de-convolution with the input images of the subject that by-pass use of a whole data set to enable residual learning.

In yet another aspect of the invention, the input images and the reference image are from different the medical imagers, where the input image of the subject includes an MM image of the subject that is used to predict a CT image of the subject.

According to one aspect of the invention, the input images of the subject, the plurality of copies of the input images of the subject and the at least one reference image of the subject includes a data set.

In a further aspect of the invention, the trained deep network is applied for improving and denoising any relative low quality medical images.

BRIEF DESCRIPTION OF THE DRAWINGS

FIGS. 2A-2B show flow diagrams of (2A) improved training and (2B) application algorithms for ASL denoising, according to one embodiment of the invention.

DETAILED DESCRIPTION

The current invention provides a method to improve the image quality of medical images. The invention provides a new end-to-end deep learning framework of taking raw image data and nonlinear filter results, which include denoised raw images with different denoising levels, and adding multi-contrast image data that have similar anatomy information with different contrasts, and generating improved image data with better quality in terms of resolution and SNR. The end-to-end framework of the current invention achieves better performance and faster speed.

In one embodiment, the invention improves the image quality of MRI imaging that typically has low SNR and resolution, for example arterial spin labeling (ASL) MRI images. The invention improves the image quality by using multi-contrast information from other images with the same anatomical structure but different contrasts, and using deep learning technique as an effective and efficient approach.

Figure 1:
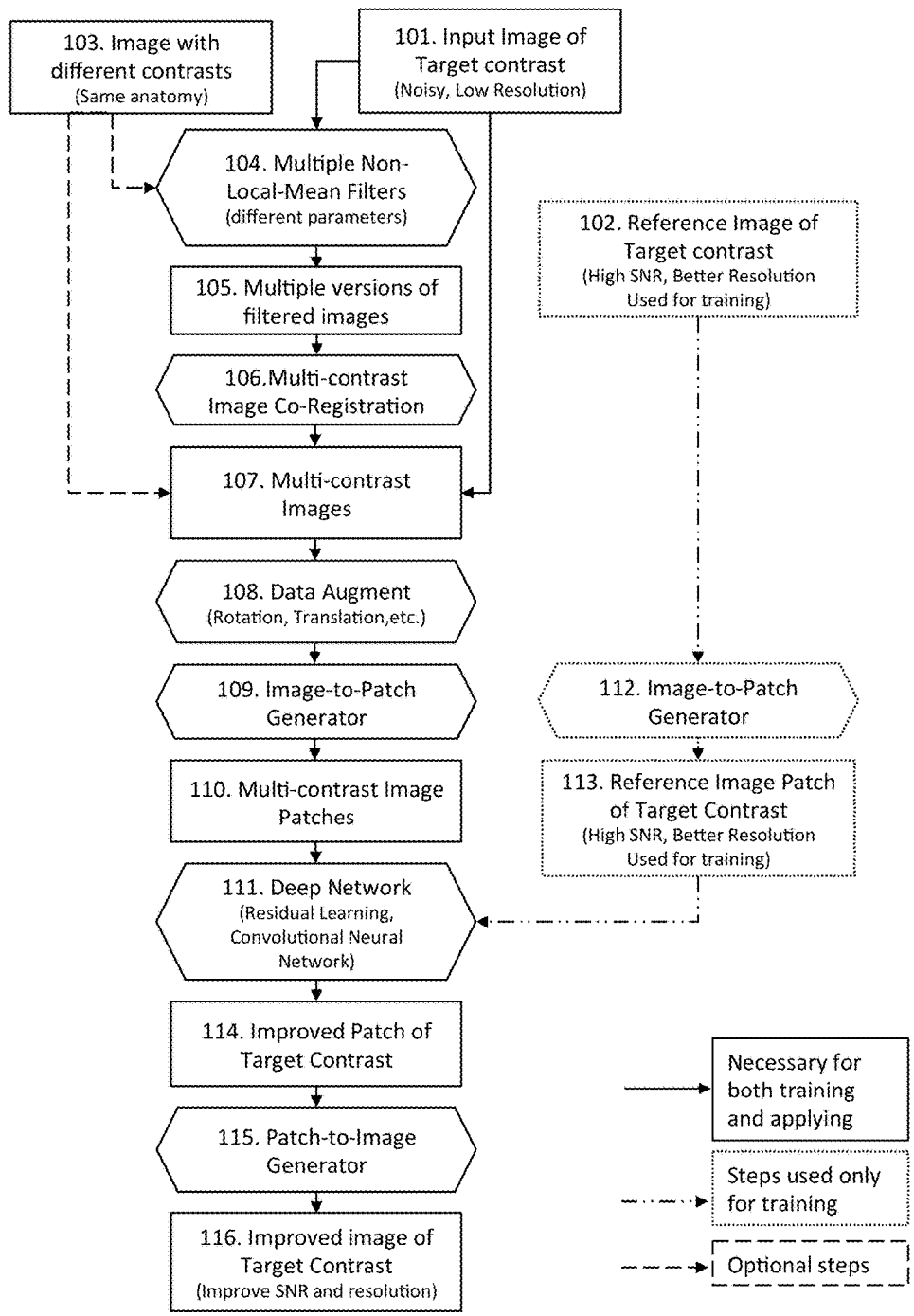
FIG. 1 shows a flow diagram of an imaging processing algorithm for improved image target contrast, according to one embodiment of the invention.

FIG. 1 shows a flow diagram of one embodiment of the invention that includes using a medical imager to obtain an image of a subject of interest, where the image is a relatively noisy, low resolution image that is input to an appropriately programmed computer. In an optional instance, other images of the same subject of interest (anatomy) and having different contrasts are also input to the computer. According to the current embodiment, multiple non-local-mean (NLM) filters having different parameters are applied to the input images, to generate multiple versions of the filtered images. Multi-contrast image co-registration is performed, then multi-contrast images are generated. An image with different contrasts and the same anatomy provided for data augmentation, where the data augmentation includes cropping, rotating, translation, and flipping. The image of a subject of interest is again input with the multi-contrast images. The algorithm provides an image-to-patch generator to fully execute the augmentation. These augmented images are input to a deep network comprising residual learning and a convolutional neural network. The model is trained using a reference image of target contrast that has a relatively high SNR and better resolution, where this image is input to an image-to-patch generator to output a reference image patch of the target contrast having high SNR and better resolution for use in training. An improved patch of the target contrast is generated and input to a patch-to-target generator, where an improved image of the target contrast is output, having improved SNR and resolution.

The current invention provides superior denoising using a data driven method that trains a model (supervised learning) based on ground truth, high SNR and high resolution images acquired using a longer scan. The model is a highly nonlinear mapping from low image quality to reference high image quality images. In this way, the model achieves significantly better performance for its specific application.

In one embodiment, multi-contrast images are used for denoising, where the multi-contrast image information is used in multiple steps that include, but are not limited to, improving a non-local mean (NLM) algorithm in which the similarity weights used for denoising are dependent on the similarity of multiple contrasts between images, or cropped portions of the images. The improvement arises in part because the SNR in multi-contrast images are much higher than the original image, such as ASL, etc., for improvement, so that the similarity can be computed more accurately. Here, if there is a pathology that can only be seen in some of the contrasts, the difference will be shown in a multi-contrast comparison and the lesion will not be over-smoothed. The invention uses the multi-contrast information as regularization for nonlinear filters, such as a NLM filter, which better regularize denoising and avoids over-smoothing.

Further, multi-contrast images are directly input to the deep network, where the deep network incorporates the multiple versions of the denoised (ASL) images and multi-contrast images as well. Due to the deep network, the model is then trained to nonlinearly ensemble all the denoised images to achieve the best image quality, that includes better SNR and better resolution.

In practice, by using the CNN method with hardware (GPU) acceleration powered by deep learning frameworks, the method can achieve improvement efficiently.

Previously, deep networks usually take millions of samples to optimize its recognition performance. In the deep learning aspects of the current invention, analogous to SRCNN models, the training is done with very small datasets. What the model learns is the residual of the difference between the raw image data and ground-truth image data, which is sparser and less complex to approximate using the network structure. The invention uses by-pass connections to enable the residual learning. Here, a residual network is used and the direct model output is the estimated residual/error between low-quality and high-quality images. This "residual training" approach reduces the complexity of training and achieves better performance, where the output level is small, reducing the likelihood of introducing large image artifacts even when the model does not predict perfectly. This is important for medical images since it is unacceptable to introduce large artifacts.

Turning now to the patch based solution aspect of the current invention. The patch based approach in training and applying it to the deep network reduces the model complexity, and resolves the lack of medical data, where the data-augmentation includes taking patches from images to improve the final results. The invention conducts this "feature-augmentation" by taking the outputs from the nonlinear filters as input for deep network, which improves the performance. The model is configured for training on the multi-contrast image patches, the model then outputs the improved version of the patches, where they are used later to synthesize the entire image. Thousands of image patches can be derived by data augmentation, which includes cropping, rotations and flips from one single image. This patch-based approach reduces the model complexity, accelerates training, resolves the lack of data, avoids overfitting, and adds more data randomization, which helps to achieve better performance. Residual training and the multi-contrast information also helps to reduce artifacts and preserve pathology.

Further, the invention uses multi-contrast information in non-conventional ways and implements a SRCNN+ResNet structure to achieve better medical image quality.

There are many potential applications for this invention, where images can be taken from previous and future scans and generate improved version of the images. This is valuable for all medical imaging devices and PACS systems. In one embodiment, the invention can be used as a part of the on-scanner reconstruction to directly output improved version of images, which can be integrated to a variety of medical imaging sequence applications. In a further embodiment, the invention provides a specific application for Arterial Spin Labeling (ASL) MM, which is used in the diagnosis of many neurological diseases. Applications to other types of images is within the scope of the invention, and immediate improvements could be imagined for highly sampled multidirectional Diffusion Tensor Imaging (DTI). Additionally, the invention can enable the improvement of the reconstruction of under-sampled images, such as fast MM.

Arterial Spin Labeling (ASL) Mill is a powerful neuroimaging tool, which provides quantitative perfusion maps. However, ASL perfusion maps typically suffer from low SNR and resolution. Averaging from multiple scans (high Nex value) can improve the SNR, but at a cost of significantly increasing acquisition time. In one embodiment, the current invention provides a technique for improved ASL image quality with boosted SNR and/or resolution by incorporating the information of multi-contrast images, using nonlinear, non-local, spatial variant multi-lateral filtering, and training a deep network model to adaptively tune the final denoising level and further boost the SNR to improve image quality. Various in-vivo experiments by the inventors demonstrate the superior performance of the invention, which significantly accelerates ASL acquisition and improves image quality. The current invention provides a solution to this urgent issue of SNR starvation in ASL and eASL, that significantly improves image quality and accelerates ASL testing.

To summarize here, there are three main innovations of this invention that include incorporating multi-contrast information in ASL denoising, using a nonlinear spatial-variant filter to prevent over-smoothing edges, and generating the final denoising/restoration result using a deep network.

Figure 2A:
Figure 2A:
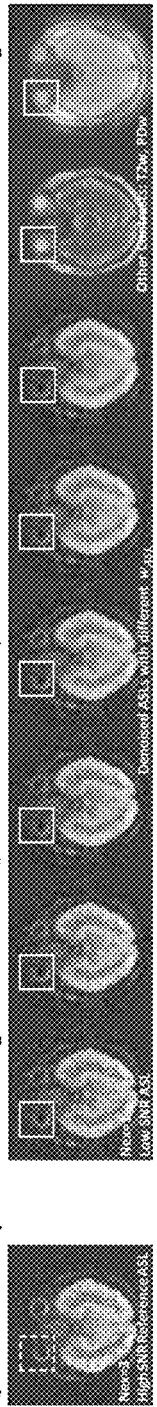
Figure 2A:
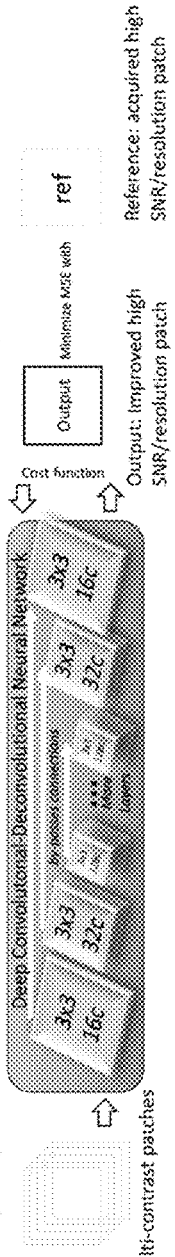
Figure 2A:
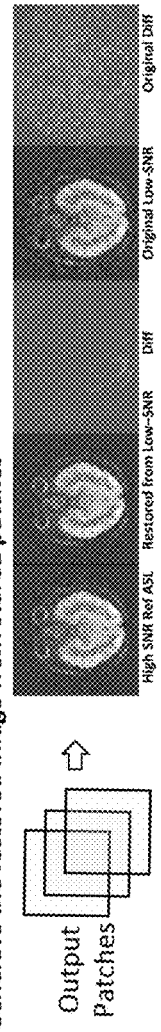

FIGS. 2A-2B show a flow diagram of a training and applying algorithms according to the current invention, which includes generating denoised ASLs with different denoising levels using multi-lateral guided filter based on low-SNR ASL image and other contrast MRI. The algorithm creates multi-contrast MRI patches from original low-SNR ASL comprising its multiple denoised versions and co-registered anatomical MRI, where T2w and PDw are shown. Further, the algorithm trains a deep network to learn the final denoising from the multi-contrast MRI patches and the corresponding patch in the reference high-SNR ASL image. Finally, the algorithm synthesizes the final denoised ASL from the output patches.

In an exemplary multi-lateral guided filtering using multi-contrast information, for an ASL exam there is always one proton density weighted (PDw) image taken without labeling. There are also highly likely to be additional anatomical scans such as T1w, T2w, FLAIR, etc, as these are often acquired as part of a routine MRI examination. These images share the basic structure information and have much higher SNR. Here the invention uses a multi-lateral guided filter to conduct location-variant weighted average for each pixel. The weight is based on the differences of ASL signal and multi-contrast anatomy MR (T2w, PDw, etc.) signals from each pixel and its neighbor pixels. Different from conventional Gaussian or Wavelet based denoising, this step is a non-local nonlinear location variant filter, which tends to better preserve structures and avoid over-smoothing. The weighting parameter here controls the smoothness.

In forming the image with multi-contrast MRI patches, after the denoising, multiple denoised ASLs with different weighting parameters are obtained. A stack of multi-contrast images are formed including: the original low-SNR ASL, multiple denoised ASL images with different smoothing levels, and co-registered T2w and PDw images. Small multi-contrast patches are then cropped (16×16, etc.) from these multi-contrast images. The final denoising works on these local stacks of patches which accelerates computation, reduces model complexity, and increases the training sample size (~10000 from one slice) to prevent any overfitting in the deep network training.

Next a process using the deep network for denoising reconstruction is implemented, which includes training a deep network to output the final denoising and restoration results. Here a convolutional-deconvolutional neural network is used with the structure as the image shows in FIG. 2A. The input of the deep network is the multi-contrast MM patches, and the output is the final denoised version. The deep network is trained on one set of slices or image sets using high-SNR/high-resolution ASL as ground-truth, and applied on different scans and slices. The final denoised ASL is formed by synthesizing the output patches.

Turning now to FIG. 2B, for applying the algorithm, the nonlinear ASL signal denoising is provided using a non-local (NLM) and a multi-contrast guided filter. Patches are then generated from high-SNR ASL reference images, low-SNR raw ASL images, multi-level denoised ASL images, and the anatomical MR images. The trained deep network is applied to generate the nonlinear image restoration from the multi-contrast patches. Finally, the restored image form the stored patches is generated for output and implementation by a physician.

Multiple in-vivo experiments were conducted. The performance of the algorithm for improving SNR was validated. Using 6 repetitions (Nex=6) as a reference high-SNR ASL, the results show that the algorithm according to the current invention reduces the error and noise for low-SNR ASL acquired with Nex=1, which is more than a four times reduction of absolute acquisition time comparing with the high-SNR reference scan. The performance of the algorithm was then validated on improving both SNR and resolution in multidelay ASL. The results demonstrate better image quality for each delay time as well as the improved transit time maps computed from them.

The in-vivo experiments demonstrate the invention provides superior performance for restoring ASL image with higher SNR and/or resolution (effectively as ~6× Nex or 4+ time reduction). Compared with conventional reconstruction and denoising results, the current invention can better reduce noise, preserve structures, and provide more detailed functional metrics such as CBF and transit-time maps. The invention can also be applied to complement parallel imaging and compressed sensing for further acquisition of ASL scans.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, higher resolution and SNR conventional MR images (such as T2w or FLAIR images, could also be effectively denoised using this approach. Or, the model could be trained to take a set of MM images as input and a CT scan as the reference image, to create an estimate of the patient's CT scan in the situation in which one was not acquired.

All such variations are considered to be within the scope and spirit of the present invention as defined by the following claims and their legal equivalents.

What is claimed:

1. A method of shortening imaging time for diagnostic and functional imaging, comprising:
    a) obtaining at least two input images of a subject, using a medical imager, wherein each said input image comprises a different contrast;
    b) generating a plurality of copies of said input images of said subject using non-local mean (NLM) filtering, using an appropriately programmed computer, wherein each said input image copy of said subject comprises different spatial characteristics;
    (c) obtaining at least one reference image of said subject, using said medical imager, wherein said at least one reference image of said subject comprises imaging characteristics that are different from said input images of said subject;
    d) training a deep network model, using data augmentation on said appropriately programmed computer, to adaptively tune model parameters to approximate said reference image from an initial set of said input images; and
    e) outputting an improved quality image of said subject, for analysis by a physician.

2. The method according to claim 1, wherein said medical imager comprises a magnetic resonance imager (MRI), or a computed tomography (CT) scanner.

3. The method according to claim 1, wherein said data augmentation is selected from the group consisting of cropping, rotating, and flipping said input images of said subject.

4. The method according to claim 1, wherein said imaging characteristics of said at least one reference image of said subject that are different from said input images of said subject are selected from the group consisting of a higher SNR, a higher resolution, less artifacts, a different image contrast, an image obtained using a CT imager, and an image obtained using an MM imager.

5. The method according to claim 1, wherein said initial set is selected from the group consisting of an arterial spin labeling (ASL) dataset, an MRI dataset, and a CT dataset.

6. The method according to claim 1, wherein said data augmentation comprises training said deep network model on a plurality of patches of the said input images of said subject for said data augmentation, wherein output images of said subject are reassembled from individual said input image patches.

7. The method according to claim 1, wherein multi-contrast information is used as a regularization for said NLM filtering for improved regularized denoising and over-smoothing avoidance.

8. The method according to claim 1, wherein said data augmentation further comprises using said input images of said subject and outputs from nonlinear filters as inputs for said deep network model, wherein said input images of said subject are acquired from arterial spin labeling (ASL) and other contrast images of a brain, wherein said NLM filtering is used on said ASL images and regularized using said other contrast images, wherein said data augmentation is used on all said input images of said subject and on images created from said NLM filtering, wherein all said augmented data is fit into said deep network model.

9. The method according to claim 8, wherein said deep network model comprises using multi-contrast patches of said other images for convolution and de-convolution with said input images of said subject that by-pass use of a whole data set to enable residual learning.

10. The method according to claim 1, wherein said input images and said reference image are from different said medical imagers, wherein said input images of said subject comprise MRI images of said subject that are used to predict a CT image of said subject.

11. The method according to claim 1, wherein said input images of said subject, said plurality of copies of said input images of said subject and said at least one reference image of said subject comprises a data set.

12. The method according to claim 1, wherein said trained deep network is applied for improving and denoising any relative low quality medical images.

* * * * *